United States Patent [19]

Taga et al.

[11] Patent Number: 5,790,289
[45] Date of Patent: Aug. 4, 1998

[54] WDM OPTICAL COMMUNICATION METHOD WITH PRE-EMPHASIS TECHNIQUE AND AN APPARATUS THEREFOR

[75] Inventors: Hidenori Taga; Noriyuki Takeda; Shu Yamamoto, all of Saitama-ken; Shigeyuki Akiba, Tokyo, all of Japan

[73] Assignee: Kokusai Denshin Denwa Kabushiki Kaisha, Tokyo, Japan

[21] Appl. No.: 651,218

[22] Filed: May 22, 1996

[30] Foreign Application Priority Data

May 26, 1995 [JP] Japan ................................. 7-151158

[51] Int. Cl.$^6$ ................................................ H04J 14/02
[52] U.S. Cl. ........................... 359/124; 359/133; 359/161; 359/110
[58] Field of Search ........................... 359/110, 124, 359/161, 177, 133, 134, 179

[56] References Cited

U.S. PATENT DOCUMENTS

| | | | |
|---|---|---|---|
| 5,225,922 | 7/1993 | Chraplyvy et al. | 359/161 |
| 5,537,238 | 7/1996 | Janniello et al. | 359/110 |
| 5,589,970 | 12/1996 | Lyu et al. | 359/133 |

FOREIGN PATENT DOCUMENTS

| | | | |
|---|---|---|---|
| 74835 | 3/1989 | Japan | 359/110 |

OTHER PUBLICATIONS

R. W. Tkach et al., "One–Third Terabit/s Transmission Through 150 km of Dispersion–Managed Fiber", ECOC '95, Post–deadline paper, pp. 45–48.

*Primary Examiner*—Leslie Pascal
*Attorney, Agent, or Firm*—Westman, Champlin & Kelly, P.A.

[57] ABSTRACT

A wavelength division multiplexed (WDM) optical communication method and apparatus uses a pre-emphasis technique to adjust the attenuation or amplification of a particular optical channel at a transmitter terminal to produce identical signal-to-noise ratios for all of the optical channels at a receiver terminal. The pre-emphasis adjustments to the transmitted signals are made on the basis of signal-to-noise ratio measurements performed at the receiver terminal. The signal-to-noise ratio values for each channel are transmitted through a facing line that is also used to transmit data along optical communication lines from the receiver terminal back to the transmitter terminal. The present invention also provides a method and apparatus for monitoring optical transmission paths for the deterioration of optical amplifier repeaters or an optical fiber. The optical signals are then adjusted to account for the location of the particular amplifier or fiber that has deteriorated.

14 Claims, 6 Drawing Sheets a2 (SIGNAL-TO-NOISE RATIO DATA)

a1 (MAIN LINE SIGNAL)

b1 (HEADER PORTION OF SDH ETC.)

DATA SIGNAL (PAYLOAD)

b2 (SIGNAL-TO-NOISE RATIO DATA)

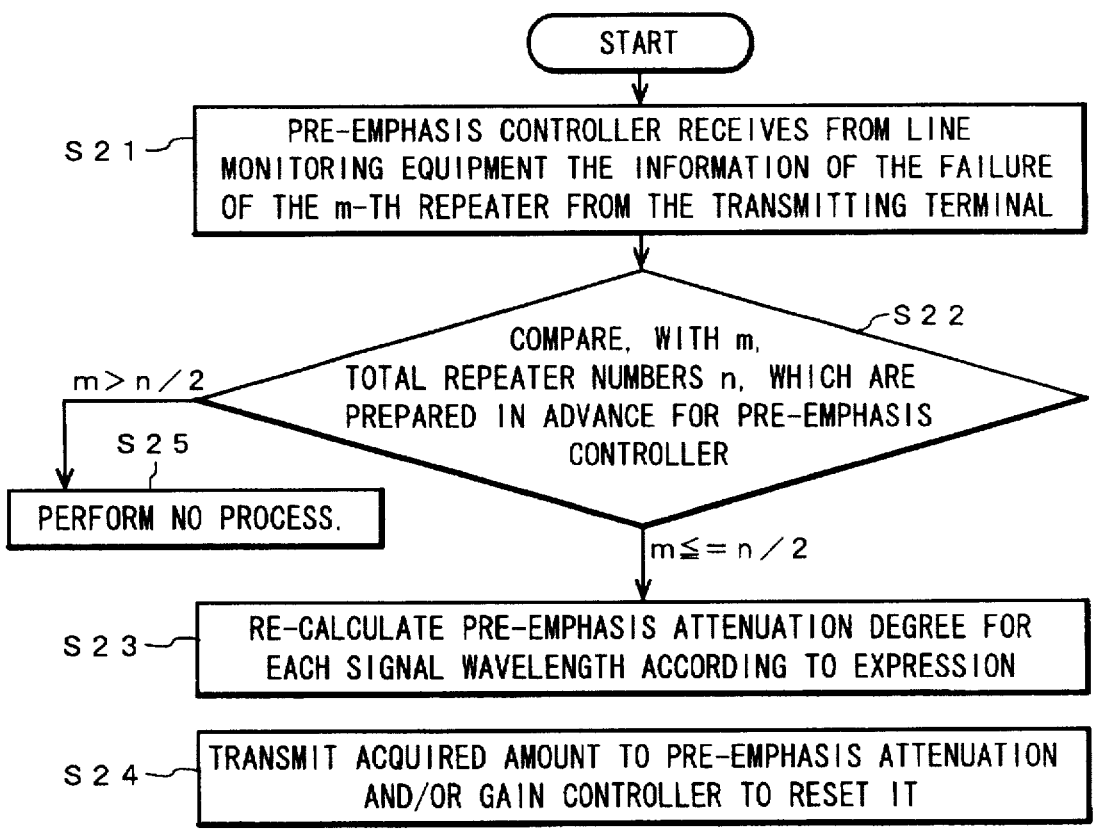

WDM OPTICAL COMMUNICATION METHOD WITH PRE-EMPHASIS TECHNIQUE AND AN APPARATUS THEREFOR

BACKGROUND OF THE INVENTION

1. Field of the Invention

The present invention relates to a WDM (Wavelength Division Multiplexed) optical communication method with pre-emphasis technique, and to an apparatus therefor; and in particular to a WDM optical communication method with pre-emphasis technique, which employs a WDM optical signal and enables to increase the transmission capacity of an optical fiber communication system, and an apparatus therefor.

2. Description of the Related Arts

Since optical fiber communication systems that utilize WDM optical signals can increase their transmission capacities without altering their transmission paths, the employment of such systems for trunk lines of optical fiber communication systems can be expected in the future. For a WDM optical signal transmission path along which multiple optical amplifiers are used to relay signals, the signal-to-noise ratios of the individual signal wavelengths of a WDM optical signal differ from each other due to the wavelength-gain responses of the optical amplifier repeaters. Specifically, there is an increased signal-to-noise ratio for a wavelength of a higher gain. As a result, the performance of the WDM optical signal is not uniform; and although a preferable performance is obtained with a wavelength having a high gain, the performance is reduced for a wavelength having a low gain.

A pre-emphasis technique at an optical transmitting terminal is well known as a method for acquiring uniform and preferable performance of a multiplexed signal for all the wavelengths. A well known example publication is "One-third Terabit/s transmission through 150 km of dispersion managed fiber", R. W. Tkach et al, ECOC '95, Post-deadline paper, pp.45–48. In this publication a technique is disclosed that uses the pre-emphasis technique to provide almost equal signal-to-noise ratios for all the channels at an optical receiving terminal.

The manner in which the pre-emphasis technique is employed for controlling pre-emphasis values depends on the experience and intuition of an operator. The operator observes in real time a signal-to-noise ratio at a receiving terminal by using a measurement device, such as an optical spectrum analyzer, while at the same time varying pre-emphasis attenuation or gain at the transmitting terminal to equalize the signal-to-noise ratios of all the signal wavelengths.

Further, as a result of study by the present inventors, it was found that with the above conventional technique a serious problem arises when a failure occurs in an optical transmission path. In a graph in FIG. 10, the difference of the reduction of the Q value due to the repeater failure is shown for both the presence or the absence of the pre-emphasis technique. In this experiment, four wavelengths were multiplexed and transmitted through eleven optical amplifier repeaters, and the repeater failure was caused by the degradation of the excitation light power by half. The pre-emphasis is performed by reducing the power for the transmission signals for channels 2 and 3 (the same method as is described in reference material "One-third terabit/s transmission through 150 km of dispersion managed fiber", W. Tkach, et al., ECOC '95, Post-deadline paper, pp. 45–48). In other words, by this method, while the power for the transmission signals on channels 1 and 4 is not changed, the power for the transmission signals on channels 2 and 3 is reduced. It is apparent from the graph in FIG. 10 that, when the pre-emphasis technique is employed, the degradation of the signal-to-noise ratio due to a failure, which occurred at a repeater close to a transmitting terminal, is drastically increased the penalty for channel 2, while there is almost no degradation of the signal-to-noise ratio for channel 4.

This can be explained as follows. When an optical amplifier along an optical transmission path fails, the output signal power of a repeater is reduced. Thus, the signal-to-noise ratios for all the WDM optical signals are degraded. When the pre-emphasis technique at the optical transmitting terminal is employed, the power of a signal wavelength having a high gain is lower than that of the signal wavelengths having a low gain, i.e. the signal power of channels 2 and 3 is lower than that of channels 1 and 4. As a result, the signal-to-noise ratio for the signal wavelengths of the channels 2 and 3 is greatly degraded compared with that for the other signal wavelengths, i.e., channels 1 and 4. Therefore, in a system wherein both a wavelength having a high gain and a wavelength having a low gain should originally have the same property, the property of the wavelength having a high gain is considerably deteriorated compared with that of the other wavelength.

The difference between the power values of WDM optical signals that are input to an optical repeater that is remote from the optical transmitting terminal is not so great; even when a failure has occurred at the repeater, the performances for the individual signal wavelengths when pre-emphasis is employed do not differ very much.

SUMMARY OF THE INVENTION

It is, therefore, one object of the present invention to provide a WDM optical communication method with a pre-emphasis technique, by which optimal pre-emphasis attenuation and/or gain can be automatically set without depending on the experience and the intuition of an operator, and by which a difference between the performances of WDM optical signals can be reduced, even when a failure occurs at an optical transmission path.

To achieve the above object, according to the present invention, provided are a method and an apparatus, whereby and wherewith: all WDM optical signals emitted by a WDM optical transmitting terminal are output with an equal transmission signal power; a signal-to-noise ratio measurement is performed for each of the WDM optical signals at a WDM optical receiving terminal; information obtained by each signal-to-noise ratio measurement is superimposed on an optical signal along a facing line by an information transfer circuit, and resultant information is fed back to a pre-emphasis control means of the WDM optical transmitting terminal; and a pre-emphasis value at the WDM optical transmitting terminal is automatically set by the pre-emphasis control means, thus providing a constant performance by each of the WDM optical signals at the WDM optical receiving terminal.

Further, according to the present invention, provided are a method and an apparatus, whereby and wherewith: when during monitoring of an optical transmission path deterioration of either an optical amplifier repeater or an optical fiber is detected, pre-emphasis control means automatically calculates a pre-emphasis value at the WDM optical transmitting terminal that is in consonance with information that indicates a location of the deteriorated optical amplifier repeater or the deteriorated optical fiber relative to the WDM optical transmitting terminal, so that the pre-emphasis control means reduces the degree of attenuation for an attenuated signal wavelength and the degree of amplification for an amplified signal wavelength, and steadily maintains total power for all optical signals that are output by the WDM optical transmitting terminal.

According to the present invention, a signal-to-noise ratio for all WDM optical signals, which are output with equal transmission signal power by a WDM optical transmitting terminal, is measured by a WDM optical receiving terminal. The measured result is superimposed on an optical signal on a facing line by an information transfer circuit, and the resultant information is returned to the WDM optical transmitting terminal. The pre-emphasis control means at the WDM optical transmitting terminal sets a pre-emphasis value based on the received information. As a result, a pre-emphasis value at the WDM optical transmitting terminal can be automatically set, so that the performances of the individual WDM optical signals are constant at the WDM optical receiving terminal.

In addition, according to the present invention, the line monitoring means detects deterioration of the optical amplifier repeater or the optical fiber. Upon receipt of the information from the line monitoring means, the pre-emphasis control means automatically calculates a pre-emphasis value at the WDM optical transmitting terminal so as to reduce the degree of attenuation of an attenuated signal wavelength and the degree of amplification of an amplified signal wavelength, and to maintain a constant sum of the power levels for optical signals, which are output at the WDM optical transmitting terminal. Therefore, even when there is deterioration of an optical amplification repeater or an optical fiber, the performance of each WDM optical signal at the WDM optical receiving terminal can be preferably maintained.

BRIEF DESCRIPTION OF THE DRAWINGS

FIG. 7 is a diagram showing an example data structure in which is included signal-to-noise ratio value;

FIG. 8 is a flowchart for processing according to a second embodiment of the present invention;

DETAILED DESCRIPTION OF THE PREFERRED EMBODIMENTS

Figure 1:
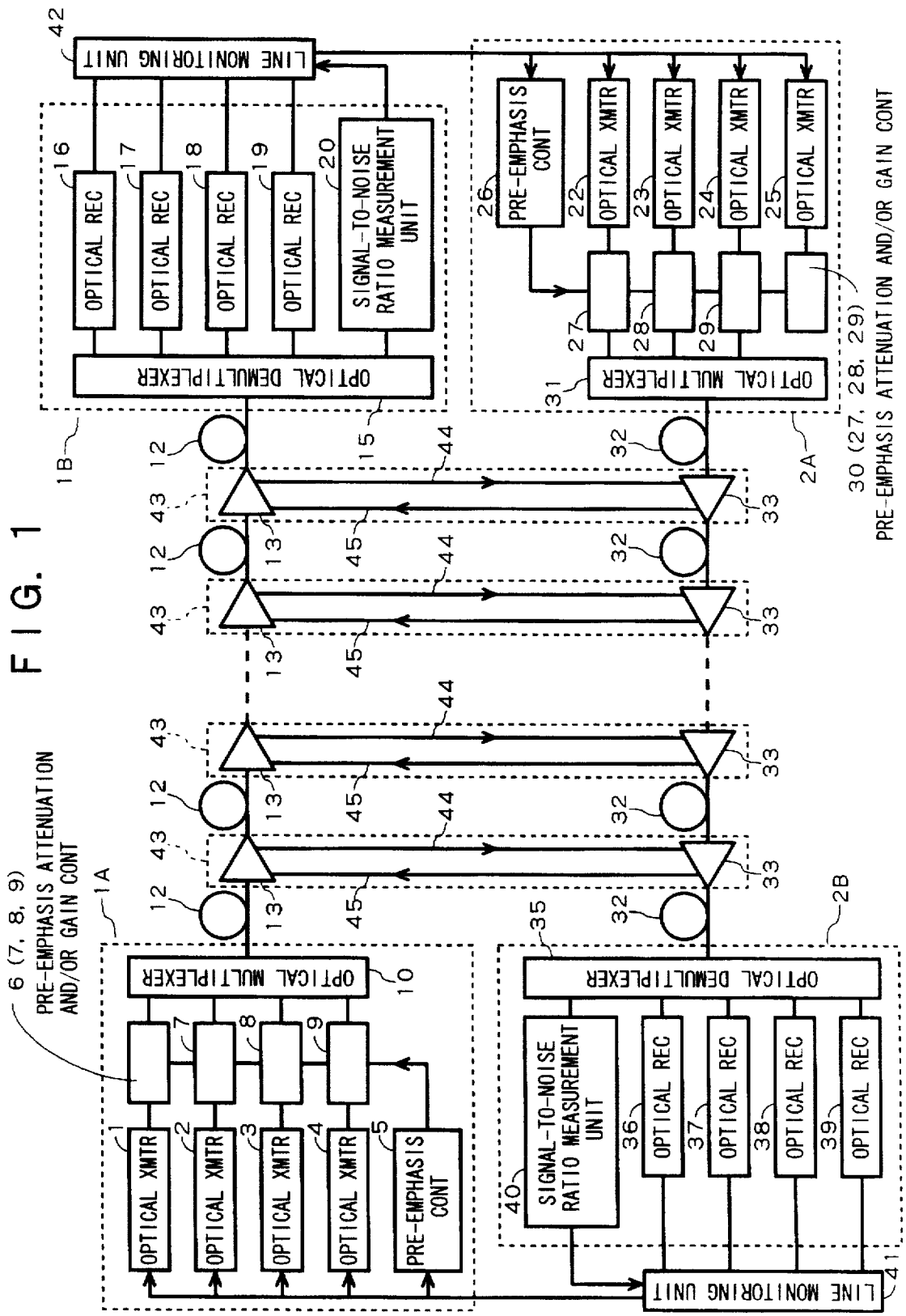
FIG. 1 is a schematic block diagram illustrating the structure of a WDM optical communication apparatus with pre-emphasis technique according to the present invention.

The present invention will now be described in detail while referring the accompanying drawings. FIG. 1 is a schematic block diagram illustrating the arrangement of the present invention. A WDM optical transmitting terminal 1A along an upstream line comprises optical transmitters (XMTRs) 1 through 4 for channels 1 through 4 for an upstream line; a pre-emphasis controller 5 for an upstream line; pre-emphasis attenuation and/or gain controllers (CONTs) 6 though 9 for an upstream line; and optical multiplexer 10 for channels 1 through 4 for an upstream line. One end of a transmission optical fiber 12 for an upstream line is connected to the optical multiplexer 10 and the other end is connected to an optical amplifier 13. A WDM optical receiving terminal 1B for an upstream line is connected to the last transmission optical fiber 12 across multiple optical fibers 12 and optical amplifiers 13.

The WDM optical receiving terminal 1B along the upstream line comprises optical demultiplexer 15 for channels 1 through 4 for the upstream line; optical receivers (RECs) 16 through 19 for channels 1 through 4 for the upstream line; and a signal-to-noise ratio measurement unit 20. A line monitoring unit 42 superimposes a signal-to-noise ratio of each channel 1 to 4, which is measured by the signal-to-noise measurement unit 20, on an optical signal at one arbitrary channel from among channels 1 through 4 for a downstream line, and transmits the resultant signal to a WDM optical receiving terminal 2B along the downstream line. The line monitoring unit 42 also monitors the condition of the downstream line that is constituted by transmission fibers 32 and optical amplifiers 33 by using a line monitoring signal, which is returned across a return circuit that will be described later.

A WDM optical transmitting terminal 2A along the downstream line comprises: optical transmitters 22 through 25 for channels 1 through 4 for the downstream line; a pre-emphasis controller 26 for the downstream line; pre-emphasis attenuation and/or gain controllers 27 through 30 for the downstream line; and an optical multiplexer 31 for channels 1 through 4 for the downstream line. One end of the transmission optical fiber 32 for the downstream line is connected to the optical multiplexer 31, and the other end is connected to the optical amplifier 33. The WDM optical receiving terminal 2B along the downstream line is connected to the last transmission optical fiber 32 across multiple transmission optical fibers 32 and the optical amplifiers 33.

The WDM optical receiving terminal 2B along the downstream line comprises an optical demultiplexer 35 for channels 1 through 4 for the downstream line; optical receivers 36 through 39 for channels 1 through 4 for the downstream line; and a signal-to-noise measurement unit 40. A line monitoring unit 41 monitors the condition of the upstream line that is constituted by the transmission fibers 12 and the optical amplifiers 13 by using a line monitoring signal, which is returned across a return circuit that will be described later. In addition, the line monitoring unit 41 superimposes a signal-to-noise ratio for each channel 1 to 4, which is measured by the signal-to-noise measurement unit 40, on an optical signal for the upstream line, and transmits the resultant signal to the WDM optical receiving terminal 1B along the upstream line.

Optical amplifier repeaters 43, which are inserted into the upstream and downstream lines at proper intervals, each comprise: an optical amplifier 13 for the upstream line; an optical amplifier 33 for the downstream line; a return circuit 44 for returning a line monitoring signal from the upstream line to the downstream line; and a return circuit 45 for returning a line monitoring signal from the downstream line to the upstream line.

Figure 2:
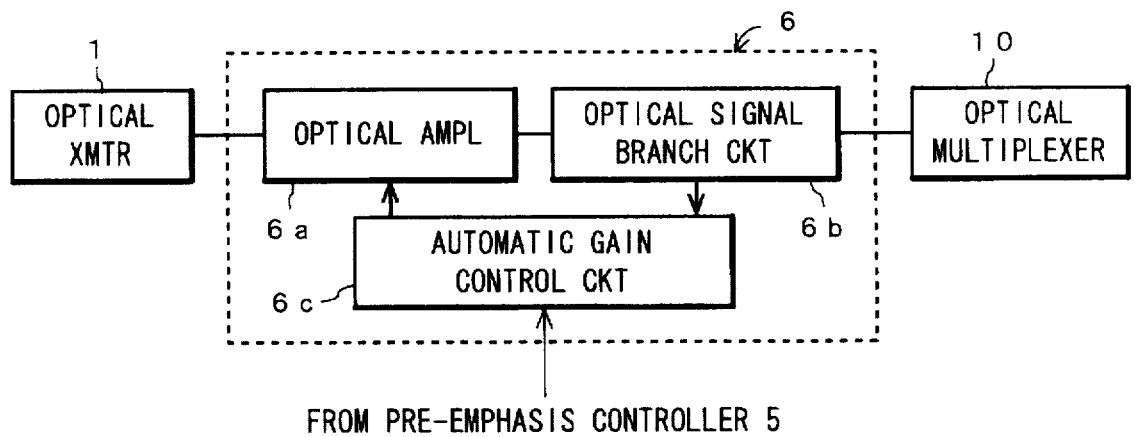
FIG. 2 is a block diagram illustrating a specific example of the arrangement of a pre-emphasis attenuation and/or gain controller.

One specific example arrangement of the pre-emphasis attenuation and/or gain controller 6 through 9 and 27 through 30 will now be explained while referring to FIG. 2. Although the pre-emphasis attenuation and/or gain controller 6 is employed for explanation, the other pre-emphasis attenuation and/or gain controllers 7 through 9 and 27 through 30 have the same structure. The pre-emphasis attenuation and/or gain controller 6 includes an optical amplifier (AMPL) 6a for amplifying an optical signal that is received from the optical transmitter 1; an optical signal branch circuit 6b; and an automatic gain control circuit 6c. The optical signal branch circuit 6b outputs to the optical multiplexer 10 an optical signal from the optical amplifier 6a, and also dispatches one part of the optical signal to the automatic gain control circuit 6c. Upon receipt of the part of the optical signal and a control signal from the pre-emphasis controller 5, the automatic gain control circuit 6c sets a gain for the optical amplifier 6a, i.e., a pre-emphasis value. A variable optical attenuator, which incorporates a GP-IB (computer interface) sold by HP Corp., can be employed as another example for the pre-emphasis attenuation and/or gain controller 6.

Figure 3:
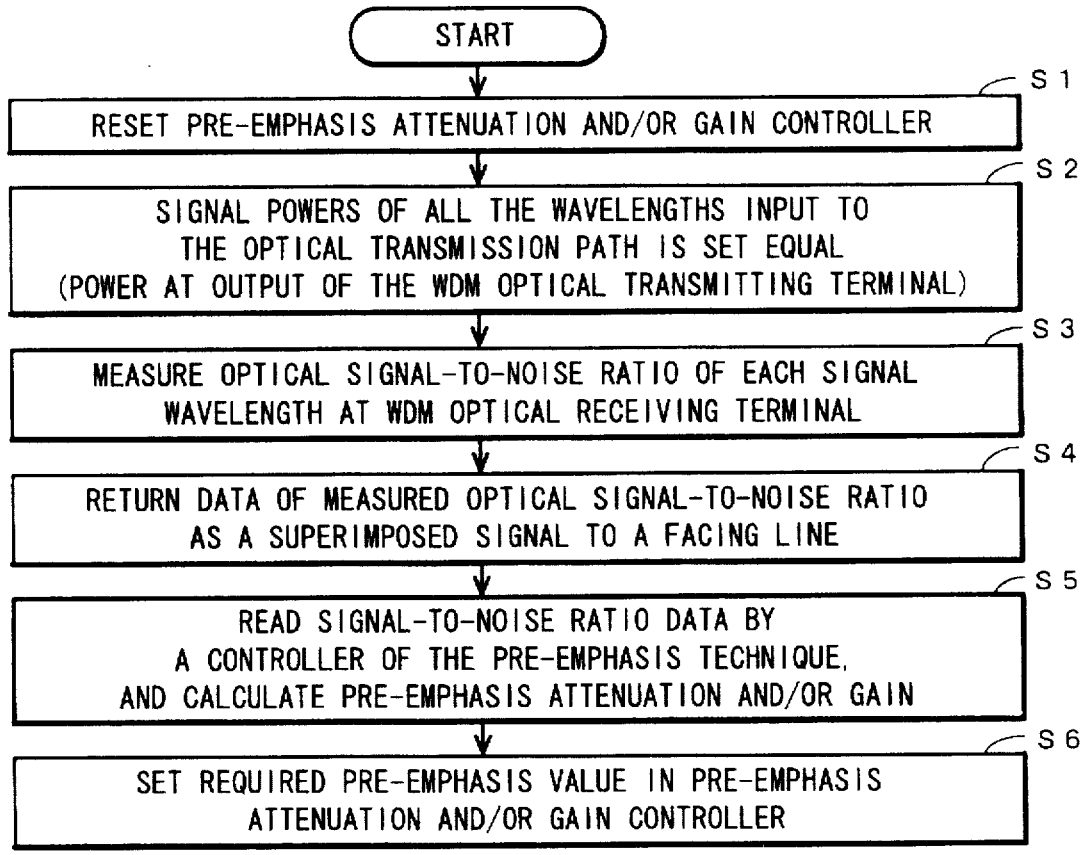
FIG. 3 is a flowchart showing the processing for setting a pre-emphasis value according to a first embodiment of the present invention.
Figure 5:
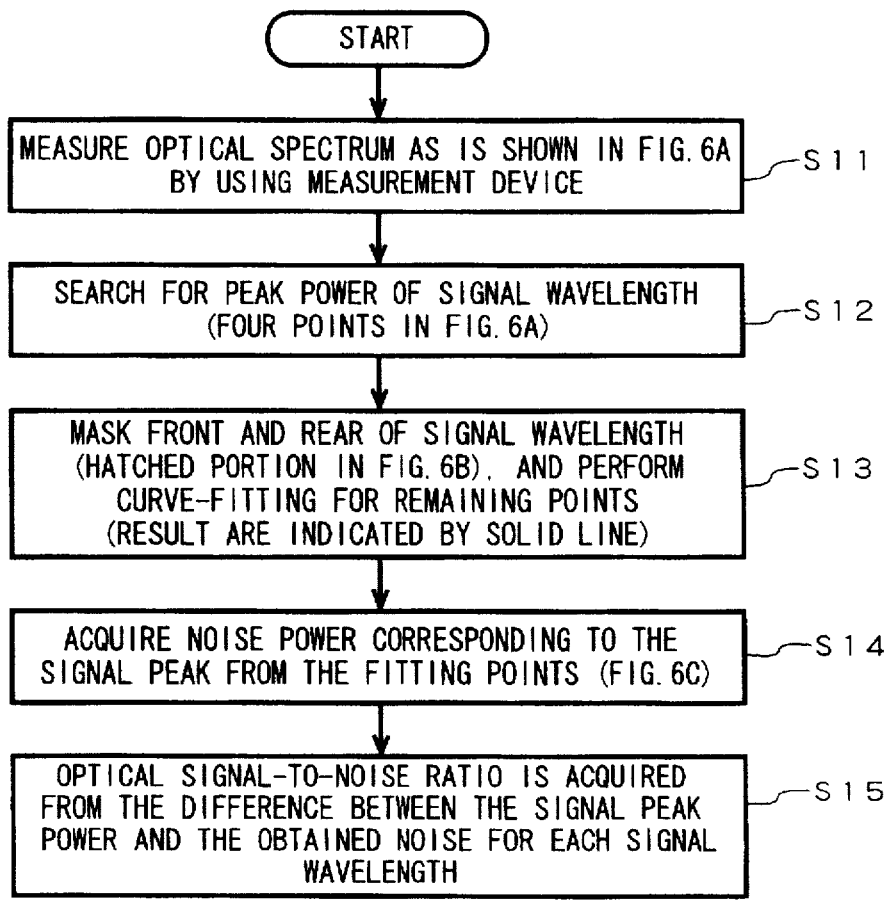
FIG. 5 is a detailed flowchart for the process at step S3 in FIG. 3.

The process for setting a pre-emphasis value for the pre-emphasis attenuation and/or gain controllers 6 though 9 will now be explained while referring to FIG. 3. At step S1, the pre-emphasis controller 5 resets the pre-emphasis attenuation and/or gain controllers 6 through 9. By this resetting, at step S2 the power values of the wavelengths for channels 1 through 4 that are input across the light transmission path 12, i.e., the power values at the output points of the WDM optical transmitting terminal 1A, are equal. At step S3, the WDM optical receiving terminal 1B measures the signal-to-noise ratio of each signal wavelength. The process at step S3 will be described in detail later while referring to FIG. 5.

Figure 4A:
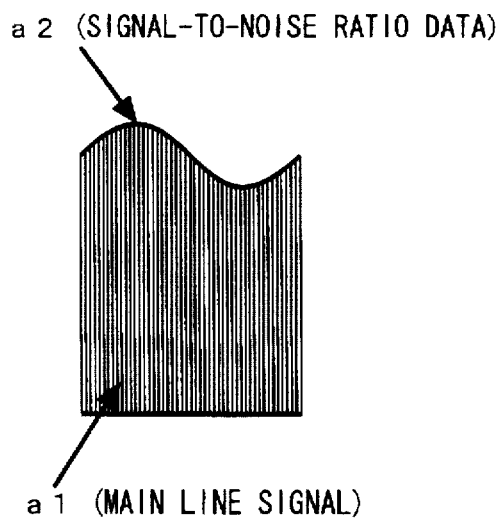
FIGS. 4A and 4B are explanatory diagrams showing a method for transmitting a signal-to-noise ratio data.
Figure 4B:
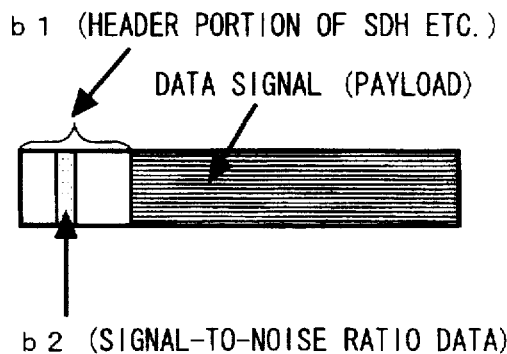

At step S4, the WDM optical receiving terminal 1B returns the acquired signal-to-noise ratio data from the WDM optical transmitting terminal 2A across the downstream line to the WDM optical receiving terminal 2B. For example, the acquired signal-to-noise ratio data are transmitted from the optical transmitter 22 of the WDM optical transmitting terminal 2A along the downstream line, and are received by an optical receiver 36 of the WDM optical receiving terminal 2B. A method shown in FIG. 4A or 4B, for example, can be employed for returning the signal-to-noise ratio data. In FIG. 4A is shown an example wherein signal-to-noise ratio data a2, which is a tone signal having a low frequency, is superimposed on a main line signal a1, which is a high speed digital signal. In FIG. 4B is shown an example wherein bit b2 that is included in a header portion b1 of the main line signal is used as data for returning the signal-to-noise ratio data.

At step S5, the pre-emphasis controller 5 reads the signal-to-noise data that are received by the WDM optical receiving terminal 2B along the downstream line e.g., that are received by the optical receiver 36, and calculates a pre-emphasis value. At this time, the pre-emphasis controller 5 regards, as a pre-emphasis value for each signal wavelength, a relative value between the signal-to-noise ratio, of the signal wavelength, that is the most preferable and the signal-to-noise ratio of each signal wavelength. More specifically, the pre-emphasis controller 5 performs a calculation to ensure that the transmission power from the WDM optical transmitting terminal is increased for the wavelengths that have a lower signal-to-noise ratio, and to ensure that all the optical power values of the WDM optical signals at the WDM optical transmitting terminal are maintained steady before and after the pre-emphasis calculation is performed.

At step S6, the pre-emphasis controller 5 sets the pre-emphasis value for the individual pre-emphasis attenuation and/or gain controllers 6 through 9.

Figure 6A:
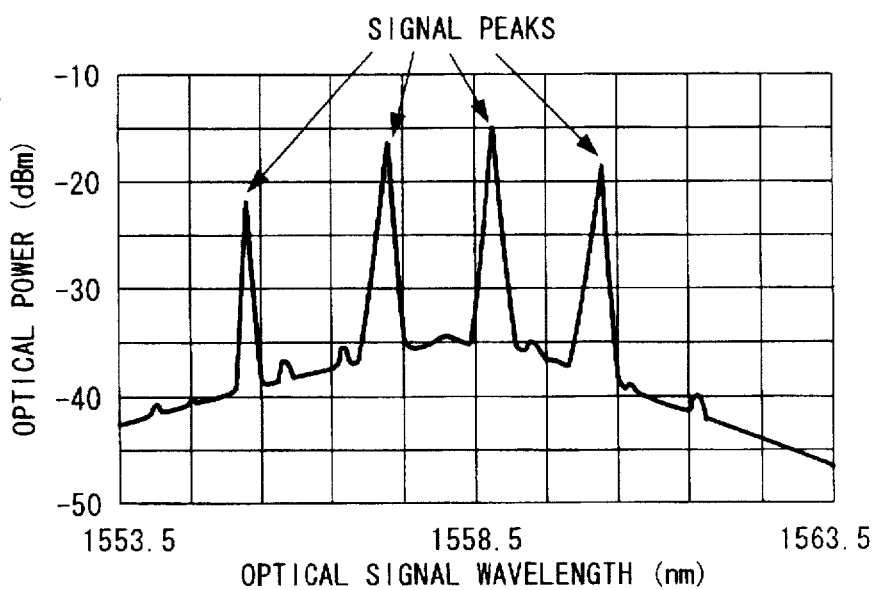
FIGS. 6A, 6B and 6C are graphs for explaining the processing at steps S12, S13 and S14 in FIG. 5.
Figure 6B:
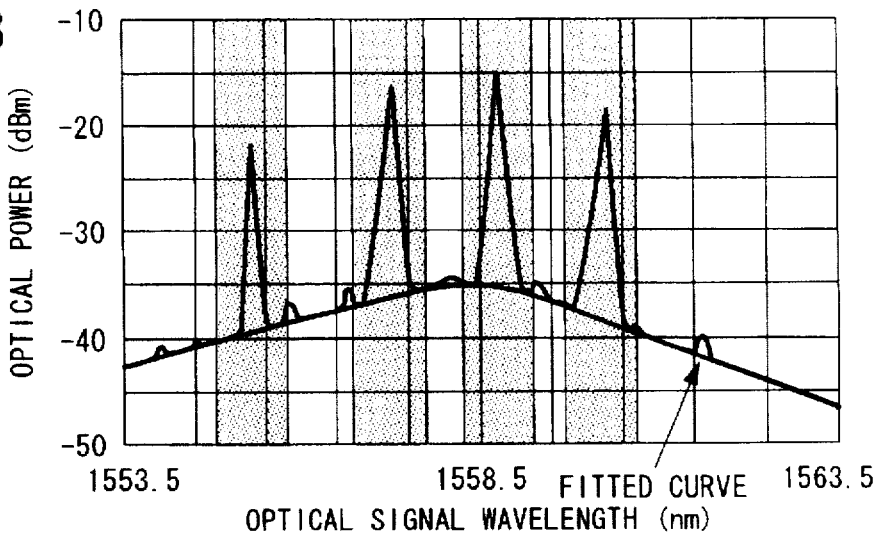
Figure 6C:
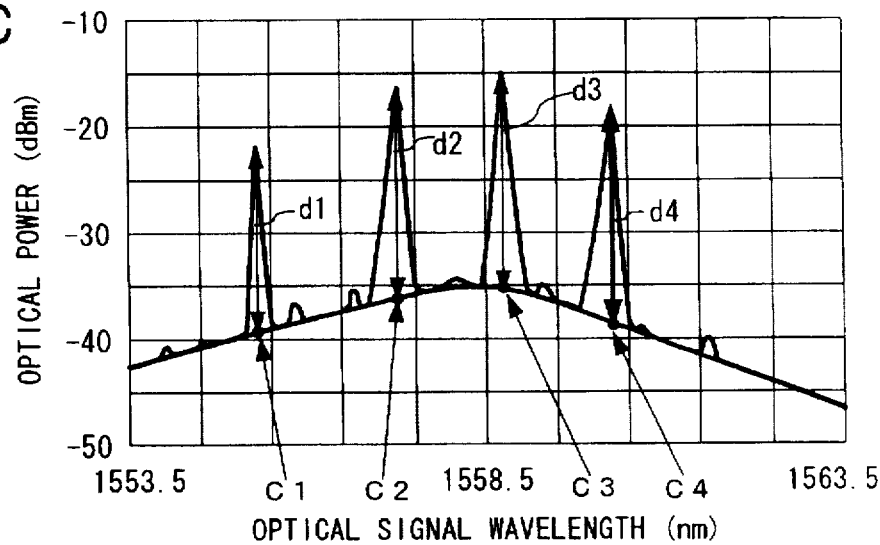

The process at step S3, i.e., the processing performed by the WDM optical receiving terminal 1B for measuring the signal-to-noise ratio of each signal wavelength, will now be explained in detail. A WDM optical signal is received via the transmission optical fiber 12 at the signal-to-noise ratio measurement unit 20 of the WDM optical receiving terminal 1B. At step S11, the signal-to-noise ratio measurement unit 20 performs an optical spectrum measurement, as is shown in FIG. 6A. At step S12, a peak for each signal wavelength is searched for. In an example shown in FIG. 6A, the heights of four signal peaks are measured. At step S13, masking is performed in front and in back of each signal wavelength, and a curve (hereinafter referred to as a "fitted curve") that is closest to all the remaining points is drawn. Hatched portions in FIG. 6B indicate those areas that are masked, and a curve indicated by the solid line is the curve for which fitting was performed. At step S14, as is shown in FIG. 6C, the noise levels at the portions that correspond to the signal peaks are acquired from values at points c1, c2, c3 and c4 at which fitting was performed. Then, at step S15, signal-to-noise ratios d1, d2, d3 and d4 are obtained from differences between the acquired noise levels and the signal peak power levels.

Thus, the acquired signal-to-noise ratio data are prepared so that they are correlated with channel numbers, as is shown in FIG. 7, and are returned with the signal form in FIG. 4 to the WDM optical receiving terminal 2B.

As is apparent from the above description, according to this embodiment, the pre-emphasis value of the pre-emphasis attenuation and/or gain controllers 6 through 9 can be automatically set without depending on the experience and intuition of an operator. As a result, the performances of the WDM optical signals, which are received by the WDM optical receiving terminal 1B, are uniform, and preferable performances can be provided automatically.

The operation of the WDM optical communication apparatus with the pre-emphasis technique in this embodiment will now be described. The line monitoring unit 41 for the upstream line employs an optical transmitter for an upstream line, e.g., the optical transmitter 1, for superimposing on a transmission signal an amplitude modulation signal having a low frequency. The degree of modulation in this amplitude modulation is small, several % or lower (e.g., 1 to 2%), so as not to degrade the performance of the transmission signal. An optical signal that is emitted by the optical transmitter 1 is forwarded through the pre-emphasis attenuation and/or gain controller 6 and the optical multiplexer 10 to the upstream line and via the optical amplifier repeaters 43 to the WDM optical receiving terminal 1B for the upstream line. One part of the optical signal is returned to the downstream transmission path by the return circuit 44 that is provided in each optical amplifier repeater and that has a loss. The loss at the return circuit 44 is set so that a signal along the downstream path is not degraded by a signal returned along the upstream path, and is about 45 dB.

A signal, which is returned by the return circuit 44 and is attenuated to about 45 dB relative to the output level of the optical amplifier along the upstream line, is transmitted through the transmission optical fiber 32 and the optical amplifier repeater 33 along the downstream line to the optical receiver for the downstream line, i.e., the optical receiver 36. The line monitoring unit 41 receives the signal that was input at the optical receiver 36, cancels a signal along the downstream path, and demodulates the amplitude modulation signal having a low frequency that was previously superimposed.

The optical amplifier relative to the transmission side for which output is deteriorated can be detected as follows. The line monitoring unit 41 for the upstream line measures and stores in advance data concerning the amount of level variation of the light that is returned by each of the optical amplifiers when these optical amplifiers are operated normally. Then, when practical use of the transmission path is being made, the line monitoring unit 41 acquires an output level for the optical amplifier of the upstream path by using a time delay value and a time correlation value between a transmission line monitoring signal and a reception line monitoring signal. The line monitoring unit 41 compares the output level change with the above described data that are stored in advance, and determines whether or not each of the optical amplifiers is operating normally.

Figure 9:
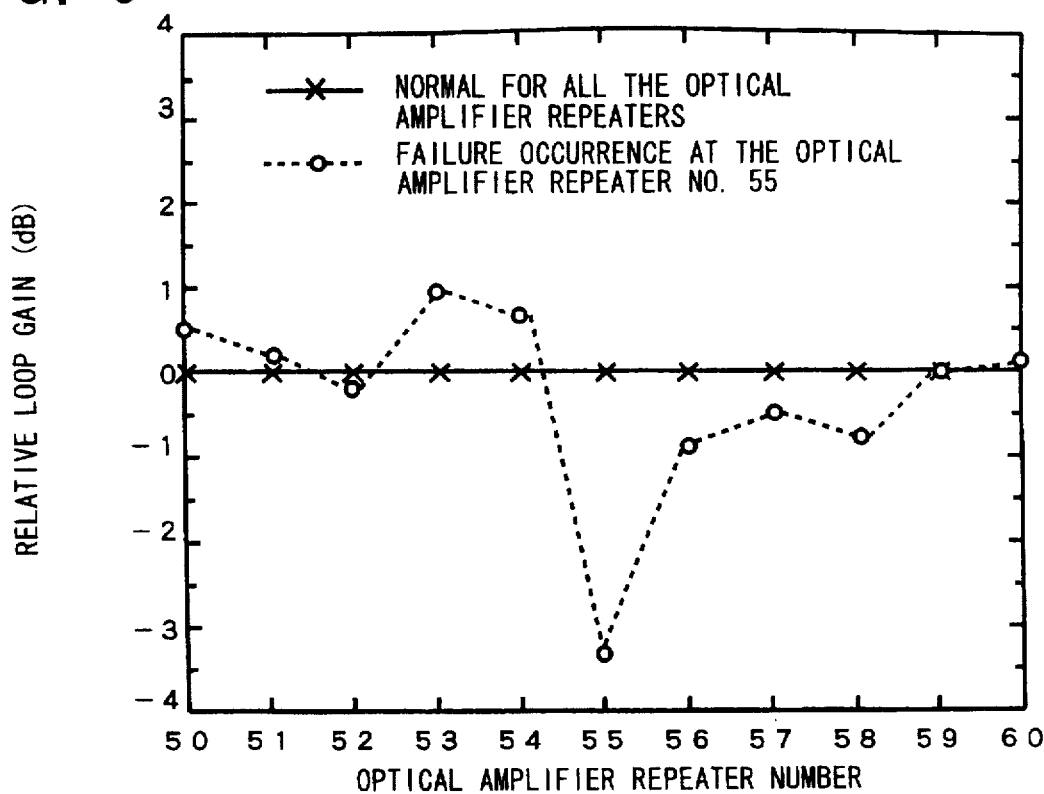
FIG. 9 is a graph showing a relative loop gain when a failure has occurred at an amplifier repeater.
Figure 10:
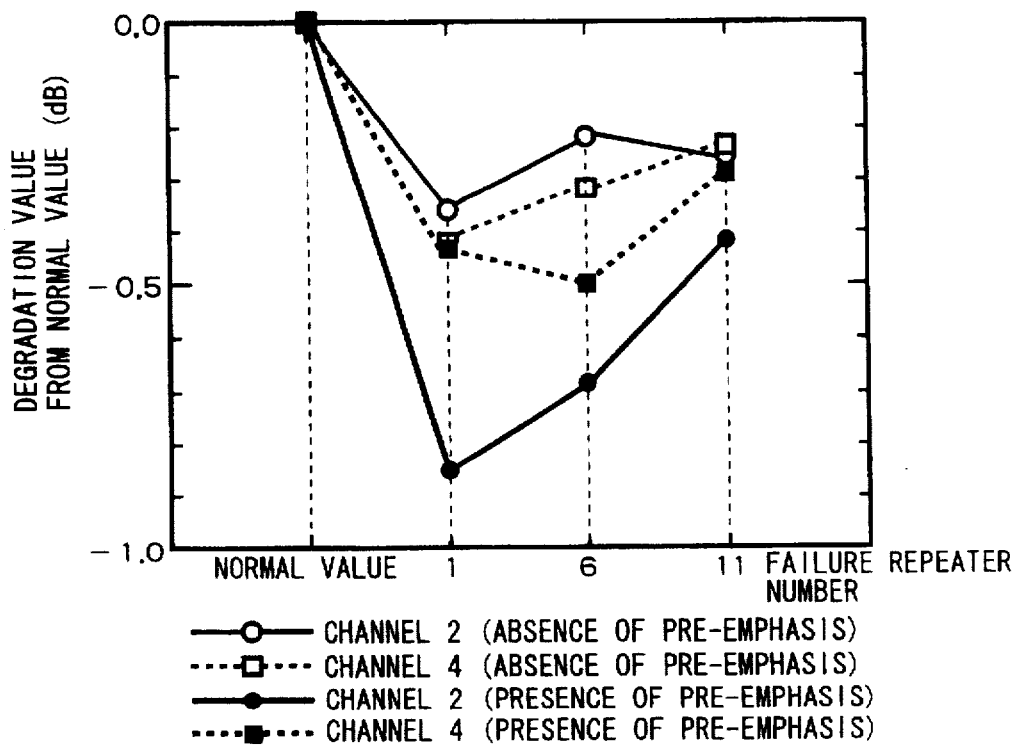
FIG. 10 is a graph showing the degree of deterioration from a normal value at an optical receiving terminal when a failure has occurred at an amplifier repeater.

FIG. 9 is a graph showing an example for measuring a fluctuation level for each optical amplifier repeater, and a measurement example wherein the output of the optical amplifier repeater 55 is degraded. Points "X" in the graph indicate an measurement example wherein all the optical amplifier repeaters are normal, and points "O" indicate an example wherein a failure has occurred at the optical amplifier repeater 55. During normal operation, since fluctuation in the output level is the same as the fluctuation data that are stored in advance, a relative loop gain is 0. However once a failure has occurred at one of the optical amplifiers, the fluctuation of its output level is reduced greatly. In the example shown in FIG. 9, since the level of a return signal output from the optical amplifier repeater 55 is greatly reduced, it is understood that some failure has occurred at the optical amplifier repeater 55.

Therefore, when a failure has occurred at an optical amplifier repeater 43 for the upstream line and the property is degraded, at which optical amplifier repeater relative to the transmission side a failure has occurred can be detected. An example of the technique concerning the monitoring of the optical amplifier repeaters is disclosed in detail in Japanese Unexamined Patent Publication No. Hei 5-344067, which was submitted by the present applicant.

The pre-emphasis control, which is applied when some deterioration occurs at an optical amplifier repeater along the transmission path that includes the optical fibers 12 and the optical amplifiers 13, will be explained while referring to the flowchart in FIG. 8.

Suppose that the total number of the optical amplifiers that are located along the transmission path is n. At step S21, the line monitoring unit 41 determines at which optical amplifier 13 relative to the transmission side has deterioration of output occurred, and transmits this information to the pre-emphasis controller 5. In this embodiment, it is assumed that the deterioration of output has occurred at the m-th optical amplifier relative to the transmission side (m is a positive integer).

At step S22, the pre-emphasis controller 5 compares half of the total n of the optical amplifiers with m. If m≦n/2, program control advances to step S23, and the pre-emphasis value for each signal wavelength is recalculated using the following expression:

$$y = 1/\log n \cdot \{\log n - \log(n/2 - m + 1)\} \cdot x$$

x(dB) denotes the initial value of a pre-emphasis value and y(dB) denotes a pre-emphasis value after conversion. The above expression was obtained through various experiments, and is thus an empirical expression. That is, when a failure is caused in optical amplifiers at different locations for simulation, and the fluctuation values of the pre-emphasis value at that time are represented on a graph, the results that can be obtained approximate those that can be obtained by using the above expression.

At step S24, the value acquired by re-calculation is transmitted to the pre-emphasis attenuation and/or gain controllers 6 through 9, and is set again. For example, if the initial value x is employed as the pre-emphasis value for channels 2 and 3, the pre-emphasis value for channels 2 and 3 are again set to y(dB). With this setup, the performances of the wavelengths for channels 1 through 4 that are to be received by the WDM optical receiving terminal 1B can be almost equalized with this control, the pre-emphasis value at the WDM optical transmitting terminal is so controlled that the degree of attenuation is reduced for the attenuated signal wavelength and the degree of amplification is reduced for the amplified signal wavelength, and that the power for all the optical signals that are output by the WDM optical transmitting terminal is constant. If the decision at step S22 is m>n/2, program control goes to step S25 and the process is thereafter terminated without performing any processing.

As is described above, according to this embodiment, even when a failure has occurred in the optical amplifier repeater along the transmission path and its transmission property has been deteriorated, a pre-emphasis value can be controlled so that there is no difference between the performances of the WDM optical signals.

As is apparent from the above description, according to the present invention, an optimal pre-emphasis value for the pre-emphasis attenuation and/or gain controllers can be set automatically without depending on the experience and the intuition of an operator. Further, according to the present invention, even when there has been deterioration of an optical amplifier repeater or an optical fiber along the optical transmission path while working, a difference between the performances of the WDM optical signals can be reduced. In addition, according to the present invention, the setting of a pre-emphasis value for the WDM optical communication apparatus, and the transmission property when a failure occurs are substantially improved, and the present invention provides great results when employed for the construction of a WDM optical communication system.

What is claimed is:

1. A WDM optical communication method with pre-emphasis technique, whereby a transmission power level is reduced for a wavelength having a high gain for an optical amplifier and a transmission power level is increased for a wavelength having a low gain to vary a transmission signal power level at a WDM optical transmitting terminal for each WDM optical signal, so as to correct a difference between signal-to-noise ratios of said WDM optical signals at a WDM optical receiving terminal, which is caused by a wavelength-gain response of an optical amplifier repeater, comprising the steps of:

outputting all WDM optical signals emitted by said WDM optical transmitting terminal with an equal transmission signal power;

performing a signal-to-noise ratio measurement for each of said WDM optical signals at said WDM optical receiving terminal;

superimposing information obtained by each signal-to-noise ratio measurement on an optical signal, transmitting the resultant information to an optical receiver at the WDM optical transmitting terminal through a facing line from an optical transmitter at the WDM optical receiving terminal, and feeding the resultant information back to a pre-emphasis control means of said WDM optical transmitting terminal; and automatically setting a pre-emphasis value at said WDM optical transmitting terminal by said pre-emphasis control means, thus providing a constant performance for each of said WDM optical signals at said WDM optical receiving terminal.

2. A WDM optical communication method with pre-emphasis technique according to claim 1, wherein said pre-emphasis control means determines a pre-emphasis value for each of said WDM optical signals from a value relative to a signal wavelength having a highest signal-to-noise ratio, and increases said transmission power level at said WDM optical transmitting terminal for an optical signal having a low signal-to-noise ratio.

3. A WDM optical communication method with pre-emphasis technique according to claim 2, wherein said pre-emphasis value is automatically calculated so as to maintain a sum of powers of said WDM optical signals at said WDM optical transmitting terminal before and after pre-emphasis control is performed, and a change of said pre-emphasis value is thus enabled.

4. A WDM optical communication apparatus with pre-emphasis technique, which reduces a transmission power level for a wavelength having a high gain for an optical amplifier and increases a transmission power level for a wavelength having a low gain to vary a transmission signal power level at a WDM optical transmitting terminal for each WDM optical signal, so as to correct a difference between signal-to-noise ratios of said WDM optical signals at a WDM optical receiving terminal, which is caused by a wavelength-gain response of an optical amplifier repeater, comprising:

pre-emphasis control means provided in said WDM optical transmitting terminal;

pre-emphasis power level control means for setting a transmission power level for each of said WDM optical signals based on a control signal from said pre-emphasis control means;

signal-to-noise ratio measurement means, provided in said WDM optical receiving terminal, for automatically measuring a signal-to-noise ratio; and means for feeding information, which is acquired by said signal-to-noise ratio measurement means, back to said pre-emphasis control means by transmitting the information to an optical receiver at the WDM optical transmitting terminal through a facing line from an optical transmitter at the WDM optical receiving terminal, which provided in said WDM optical transmitting means, whereby said pre-emphasis control means automatically sets a pre-emphasis value for said WDM optical transmitting terminal by using said information that is fed back, so that said signal-to-noise ratio of each of WDM optical signals is equal at said WDM optical receiving terminal.

5. A WDM optical communication apparatus with pre-emphasis technique according to claim 4, wherein said pre-emphasis control means determines a pre-emphasis value for each of said WDM optical signals from a value relative to a signal wavelength having a highest signal-to-noise ratio, and increases said transmission power level at said WDM optical transmitting terminal for an optical signal having a low signal-to-noise ratio.

6. A WDM optical communication apparatus with pre-emphasis technique according to claim 5, wherein said pre-emphasis control means automatically calculates pre-emphasis values so as to maintain a sum of powers of said WDM optical signals at said WDM optical transmitting terminal before and after pre-emphasis control is performed, and a change of said pre-emphasis value is thus enabled.

7. A WDM optical communication apparatus with pre-emphasis technique according to claim 4, wherein said pre-emphasis power level control means is a variable optical attenuator.

8. A WDM optical communication apparatus with pre-emphasis technique according to claim 4, wherein said pre-emphasis power level control means is a gain variable amplifier.

9. A WDM optical communication method with pre-emphasis technique, whereby a transmission power level is reduced for a wavelength having a high gain for an optical amplifier and a transmission power level is increased for a wavelength having a low gain to vary a transmission signal power level at a WDM optical transmitting terminal for each WDM optical signal, so as to correct a difference between signal-to-noise ratios of said WDM optical signals at a WDM optical receiving terminal, which is caused by a wavelength-gain response of an optical amplifier repeater, and whereby: when during monitoring of an optical transmission path deterioration of an optical element is detected, pre-emphasis control means automatically calculates a pre-emphasis value at said WDM optical transmitting terminal that is in consonance with information that indicates a location of said deteriorated optical element relative to said WDM optical transmitting terminal, so that said pre-emphasis control means reduces the degree of attenuation for an attenuated signal wavelength and the degree of amplification for an amplified signal wavelength, and steadily maintains total power for all optical signals that are output by said WDM optical transmitting terminal.

10. A WDM optical communication method with pre-emphasis technique according to claim 9, wherein, when said deterioration of an optical amplifier repeater that is remote from said WDM optical transmitting terminal is detected, said pre-emphasis value is not to be changed.

11. A WDM optical communication method with pre-emphasis technique according to claim 10, wherein, when said deterioration of an optical amplifier repeater, which is located within ½ of the entire system length relative to said WDM optical transmitting terminal, is detected, said pre-emphasis value at said WDM optical transmitting terminal is controlled, and when said deterioration of an optical amplifier repeater, which is located outside ½ of the entire system length relative to said WDM optical transmitting terminal, is detected, said pre-emphasis value at said WDM optical transmitting terminal is not to be changed.

12. A WDM optical communication apparatus with pre-emphasis technique, which reduces a transmission power level for a wavelength having a high gain for an optical amplifier and increases a transmission power level for a wavelength having a low gain to vary a transmission signal power level at a WDM optical transmitting terminal for each WDM optical signal, so as to correct a difference between signal-to-noise ratios of said WDM optical signals at a WDM optical receiving terminal, which is caused by a wavelength-gain response of an optical amplifier repeater, comprising:

pre-emphasis control means provided in said WDM optical transmitting terminal;

pre-emphasis power level control means for setting a transmission power level for each of said WDM optical signals based on a control signal from said pre-emphasis control means;

line monitoring means for extracting from an optical receiver a low frequency signal that is returned from a return circuit, which is provided in an optical amplifier repeater along an optical transmission path, to an opposite transmission path, and for monitoring said low-frequency signal, whereby said pre-emphasis control means controls a pre-emphasis value at said WDM optical transmitting terminal when a deteriorated optical element is detected by said line monitoring means.

13. A WDM optical communication apparatus with pre-emphasis technique according to claim 12, wherein, when said deterioration of an optical amplifier repeater that is remote from said WDM optical transmitting terminal is detected, said pre-emphasis value is not to be changed, and wherein when said deterioration of an optical amplifier repeater that is close to said WDM optical transmitting terminal is detected, said pre-emphasis value is controlled.

14. A WDM optical communication apparatus with pre-emphasis technique according to claim 13, wherein, when said deteriorated optical amplifier repeater is located within ½ of the entire system length relative to said WDM optical transmitting terminal, said line monitoring means controls said pre-emphasis value, and wherein when said deteriorated optical amplifier repeater is located outside ½ of the entire system length, said line monitoring means does not provide any change for said pre-emphasis value.

* * * * *